US012393792B2

(12) United States Patent
Bohra et al.

(10) Patent No.: US 12,393,792 B2
(45) Date of Patent: Aug. 19, 2025

(54) MULTILINGUAL SUPPORT FOR NATURAL LANGUAGE PROCESSING APPLICATIONS

(71) Applicant: Microsoft Technology Licensing, LLC, Redmond, WA (US)

(72) Inventors: Tapan Bohra, Sunnyvale, CA (US); Ji Li, San Jose, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 606 days.

(21) Appl. No.: 17/681,250

(22) Filed: Feb. 25, 2022

(65) Prior Publication Data

US 2023/0274096 A1    Aug. 31, 2023

(51) Int. Cl.
*G06F 40/49*    (2020.01)
*G06F 40/242*    (2020.01)
(Continued)

(52) U.S. Cl.
CPC ............ *G06F 40/49* (2020.01); *G06F 40/242* (2020.01); *G06F 40/253* (2020.01); *G06F 40/284* (2020.01); *G06N 20/00* (2019.01)

(58) Field of Classification Search
CPC ...... G06F 40/49; G06F 40/242; G06F 40/253; G06F 40/284
See application file for complete search history.

(56) References Cited

U.S. PATENT DOCUMENTS 9,158,559 B2    10/2015    Simmons et al.
9,195,910 B2    11/2015    Garera et al.
(Continued)

FOREIGN PATENT DOCUMENTS

WO    2020220369 A1    11/2020

OTHER PUBLICATIONS

Husain, et al., "A Survey of Offensive Language Detection for the Arabic Language", In Journal of ACM Transactions on Asian and Low-Resource Language Information Processing, vol. 20, Issue 1, Mar. 9, 2021, 44 Pages.
"International Search Report and Written Opinion Issued in PCT Application No. PCT/US22/039648", Mailed Date: Oct. 26, 2022, 11 Pages.
(Continued)

*Primary Examiner* — Daniel C Washburn
*Assistant Examiner* — Paul J. Mueller
(74) *Attorney, Agent, or Firm* — NovoTechIP International PLLC

(57) ABSTRACT

A data processing system implements obtaining textual content in a first language from a first client device and segmenting the textual content into a plurality of first tokens. The system also implements translating the first tokens from the first language to a second language using a bilingual dictionary, extracting features information from the second tokens to create a features vector, providing the feature vector to a first natural language processing model trained to analyze textual input in the second language and to output contextual information indicating one or more topics or subject matter of the first textual content, and providing the contextual information to a first machine learning model configured to analyze the contextual information and to identify one or more content items predicted to be relevant to the contextual information. The system further implements providing the information identifying the one or more content items to the first client device.

14 Claims, 7 Drawing Sheets

(51) Int. Cl.
  *G06F 40/253*  (2020.01)
  *G06F 40/284*  (2020.01)
  *G06N 20/00*   (2019.01)

(56) References Cited

U.S. PATENT DOCUMENTS

| | | | |
|---|---|---|---|
| 9,779,087 B2 | 10/2017 | Das et al. | |
| 10,033,808 B2 | 7/2018 | Simmons et al. | |
| 10,460,036 B2 | 10/2019 | Duong | |
| 10,872,204 B2 | 12/2020 | Zhu et al. | |
| 11,082,369 B1 | 8/2021 | Liu et al. | |
| 11,663,219 B1 | 5/2023 | Profirovic | |
| 11,803,883 B2 | 10/2023 | Wu | |
| 11,875,131 B2 | 1/2024 | Li | |
| 2006/0136223 A1* | 6/2006 | Brun | G06F 40/58 704/277 |
| 2008/0306728 A1 | 12/2008 | Kamatani et al. | |
| 2011/0191105 A1 | 8/2011 | Spears | |
| 2015/0019200 A1* | 1/2015 | Woodward | G06F 40/47 704/2 |
| 2018/0107945 A1 | 4/2018 | Gao et al. | |
| 2018/0314689 A1* | 11/2018 | Wang | G10L 15/1822 |
| 2018/0356957 A1 | 12/2018 | Desjardins | |
| 2019/0197484 A1 | 6/2019 | Jamali et al. | |
| 2019/0236146 A1* | 8/2019 | Niekrasz | G06N 20/20 |
| 2020/0043495 A1 | 2/2020 | Park et al. | |
| 2020/0125639 A1* | 4/2020 | Doyle | G06F 40/30 |
| 2020/0125729 A1 | 4/2020 | Priel | |
| 2020/0159871 A1 | 5/2020 | Bowen | |
| 2020/0393915 A1 | 12/2020 | Brendel et al. | |
| 2021/0264106 A1 | 8/2021 | Li et al. | |
| 2021/0357599 A1* | 11/2021 | Gupta | G06F 40/253 |
| 2022/0075945 A1 | 3/2022 | Zhang | |
| 2022/0188575 A1 | 6/2022 | Zhu et al. | |
| 2022/0198157 A1 | 6/2022 | Li et al. | |
| 2022/0366295 A1* | 11/2022 | Lamba | G06N 20/00 |
| 2023/0129314 A1 | 4/2023 | Li et al. | |
| 2023/0177281 A1* | 6/2023 | Kamath | G06N 3/08 704/2 |
| 2023/0274096 A1 | 8/2023 | Bohra et al. | |

OTHER PUBLICATIONS

Final Office Action mailed on Feb. 28, 2024, in U.S. Appl. No. 17/510,850, 28 Pages.
Lample, et al., "MUSE: Multilingual Unsupervised and Supervised Embeddings", Retrieved from: https://github.com/facebookresearch/MUSE#ground-truth-bilingual-dictionaries, Retrieved on: Jan. 20, 2022, 9 Pages.
Laujan, et al., "Quickstart: Get started with Translator", Retrieved from: https://docs.microsoft.com/en-us/azure/cognitive-services/Translator/quickstart-translator?tabs=csharp, Jan. 29, 2022, 18 Pages.
Adams et al., "Cross-Lingual Word Embeddings for Low-Resource Language Modeling," Proceedings of the 15th Conference of the European Chapter of the Association for Computational Linguistics, vol. 1, Long Papers, pp. 937-947, Apr. 2017.
Chen et al., "Model Selection for Cross-Lingual Transfer using a Learned Scoring Function", arXiv preprint arXiv:2010.06127, pp. 1-15, Oct. 2020.
He et al., "Multi-Level Cross-Lingual Transfer Learning with Language Shared and Specific Knowledge for Spoken Language Understanding", IEEE, vol. 8, pp. 29407-29416, Feb. 2020.
Non-Final Office Action mailed on Dec. 1, 2023, in U.S. Appl. No. 17/131,624, 25 pages.
Rahimi et al., "Massively Multilingual Transfer for NER", Proceedings of the 57th Annual Meeting of the Association for Computational Linguistics, pp. 151-164, Jul. 2019.
Bentaallah, et al., "The Use of Word Nets for Multilingual Text Categorization: A Comparative Study", Published in ICWIT, Jan. 1, 2012, pp. 121-128.
El-Alami, et al., "A Multilingual Offensive Language Detection Method based on Transfer Learning from Transformer Fine-tuning Model", In Journal of King Saud University—Computer and Information Sciences, Jul. 1, 2021, pp. 6048-6056.
"International Search Report and Written Opinion Issued in PCT Application No. PCT/US22/050994", Mailed Date: Mar. 27, 2023, 11 Pages.
Prajapati, et al., "Automated Text Categorization with Machine Learning and its Application in Multilingual Text Categorization", In Proceeding of National Conference on Advance Computing, Jan. 1, 2009, pp. 204-209.
Catal, et al., "A Sentiment Classification Model based on Multiple Classifiers", In Journal of Applied Soft Computing, vol. 50, Jan. 1, 2017, pp. 135-141.
"Final Office Action Issued in U.S. Appl. No. 17/131,624", Mailed Date: Apr. 18, 2023, 56 Pages.
Bari, et al., "MultiMix: A Robust Data Augmentation Strategy for Cross-Lingual NLP", In Repository of arXiv:2004.13240v1, Apr. 28, 2020, 11 Pages.
Ellis, et al., "Why We Watch the News: A Dataset for Exploring Sentiment in Broadcast Video News", In Proceedings of the 16th International Conference on Multimodal Interaction, Nov. 12, 2014, pp. 104-111.
Notice of Allowance mailed on May 22, 2024, in U.S. Appl. No. 17/510,850 11 pages.
"Non Final Office Action Issued in U.S. Appl. No. 17/131,624", Mailed Date: Sep. 14, 2022, 53 Pages.
Sun, et al., "MobileBERT: A Compact Task-Agnostic BERT for Resource-Limited Devices", In Proceedings of the 58th Annual Meeting of the Association for Computational Linguistics, Jul. 5, 2020, pp. 2158-2170.
Gupta, et al., "Compression of Deep Learning Models for Text: A Survey", In Journal of ACM Transactions on Knowledge Discovery from Data, vol. 16, Issue 4, Jan. 8, 2022, 55 Pages.
Hosseini, et al., "Crowdcloud: a Crowdsourced System for Cloud Infrastructure", In Journal of Cluster Computing vol. 22, Issue 2, Aug. 30, 2018, pp. 455-470.
Liu, et al., "Upgrading the Newsroom: An Automated Image Selection System for News Articles", In Repository of arXiv:2004.11449v1, Apr. 23, 2020, 28 Pages.
"International Search Report and Written Opinion Issued in PCT Application No. PCT/US21/060909", Mailed Date: Mar. 10, 2022, 14 Pages.
Yarowsky, et al., "Inducing Multilingual Text Analysis Tools via Robust Projection across Aligned Corpora", In Proceedings of The First International Conference on Human Language Technology Research, Mar. 18, 2001, 8 Pages.
Riloff, et al., "Inducing Information Extraction Systems for New Languages via Cross-Language Projection", In Proceedings of 19th International Conference on Computational Linguistics, Aug. 24, 2002, 7 Pages.
Pikuliak, et al., "Cross-lingual learning for text processing: A survey", In Journal of Expert Systems with Applications vol. 165, Mar. 1, 2021, 26 Pages.
U.S. Appl. No. 17/510,850, filed Oct. 26, 2021.
"Non Final Office Action Issued In U.S. Appl. No. 17/510,850", Mailed Date: Nov. 1, 2023, 29 Pages.
Final Office Action mailed on Apr. 3, 2024, in U.S. Appl. No. 17/131,624, 34 pages.
Valizadegan, et al., "Kernel Based Detection of Mislabeled Training Examples," Proceedings of the 2007 Society for Industrial and Applied Mathematics (SIAM) International Conference on Data Mining, Apr. 2007, pp. 309-319.
Notice of Allowance mailed on Aug. 30, 2024, in U.S. Appl. No. 17/131,624, 14 pages.

* cited by examiner

MULTILINGUAL SUPPORT FOR NATURAL LANGUAGE PROCESSING APPLICATIONS

BACKGROUND

Natural language processing (NLP) models have been developed that provide very accurate processing of English language textual content. Applications may use these NLP models to extract contextual information from the English language textual content and use this contextual information to provide various services to the users of the application. However, applications may have a global userbase that speaks and creates content in numerous other languages. Thus, multilingual support is critical to providing these services to global customers who do not use the English language in the content that they create.

Multilingual models trained to process both English language and non-English language text as an input would address the need to support the various the languages spoken by the global userbase. However, multilingual models need training data in the languages to be supported, and the amount of non-English training data is quite limited. Furthermore, creating additional labeled non-English training data is an expensive and labor-intensive process requiring human users to translate English language text to the corresponding non-English language text and label the data. Hence, there is a need for improved systems and methods that provide a technical solution for solving the technical problem of training providing multilingual support in natural language processing models.

SUMMARY

An example data processing system according to the disclosure may include a processor and a machine-readable medium storing executable instructions. The instructions when executed cause the processor to perform operations including obtaining textual content in a first language from a first client device; segmenting the textual content into a plurality of first tokens; translating the plurality of first tokens to a second language using a first bilingual dictionary to create a plurality of second tokens; analyzing the second tokens to extract features information from the plurality of second tokens to generate a feature vector; providing the feature vector as an input to a first natural language processing model trained to analyze textual content in the second language, the natural language processing model being configured to output contextual information indicating one or more topics or subject matter of the first textual content; providing the contextual information obtained from the first natural language processing model as an input to a first machine learning model, the first machine learning model configured to analyze the contextual information and to output information identifying one or more content items predicted to be relevant to the contextual information; and providing the information identifying the one or more content items to the first client device.

An example method implemented in a data processing system for providing content recommendations based on a multilingual natural language processing model includes obtaining textual content in a first language from a first client device; segmenting the textual content into a plurality of first tokens; translating the plurality of first tokens to a second language using a first bilingual dictionary to create a plurality of second tokens; analyzing the second tokens to extract features information from the plurality of second tokens to generate a feature vector; providing the feature vector as an input to a first natural language processing model trained to analyze textual content in the second language, the natural language processing model being configured to output contextual information indicating one or more topics or subject matter of the first textual content; providing the contextual information obtained from the first natural language processing model as an input to a first machine learning model, the first machine learning model configured to analyze the contextual information and to output information identifying one or more content items predicted to be relevant to the contextual information; and providing the information identifying the one or more content items to the first client device.

An example machine-readable medium on which are stored instructions. The instructions when executed cause a processor of a programmable device to perform operations of obtaining textual content in a first language from a first client device; segmenting the textual content into a plurality of first tokens; translating the plurality of first tokens to a second language using a first bilingual dictionary to create a plurality of second tokens; analyzing the second tokens to extract features information from the plurality of second tokens to generate a feature vector; providing the feature vector as an input to a first natural language processing model trained to analyze textual content in the second language, the natural language processing model being configured to output contextual information indicating one or more topics or subject matter of the first textual content; providing the contextual information obtained from the first natural language processing model as an input to a first machine learning model, the first machine learning model configured to analyze the contextual information and to output information identifying one or more content items predicted to be relevant to the contextual information; and providing the information identifying the one or more content items to the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
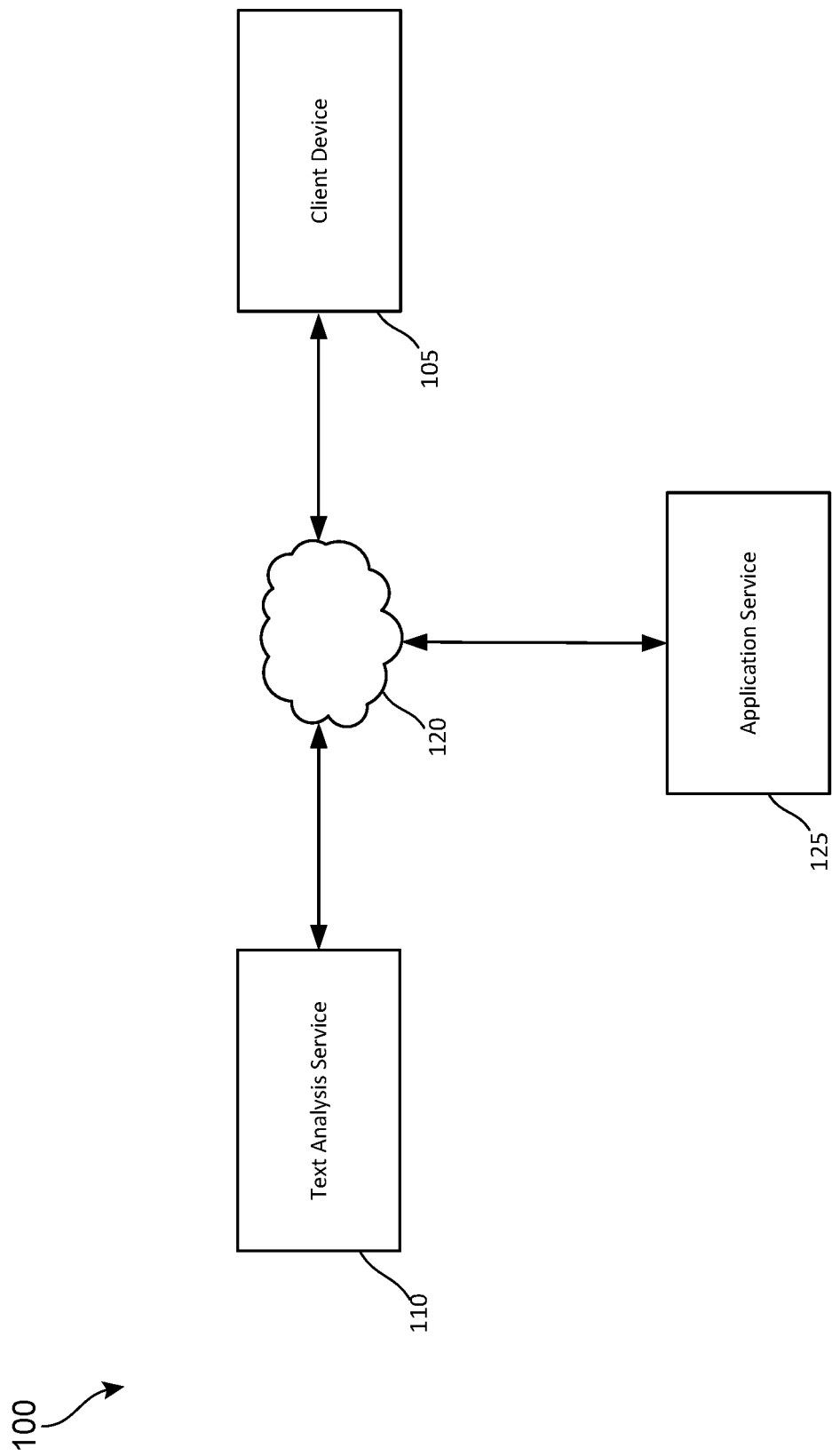
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing content recommendations using multilingual natural language processing (NLP) models presented herein provide a technical solution for solving the technical problem of providing fast, accurate, and lightweight NLP models that can process multiple languages to support a global userbase. These techniques may be used to provide content recommendations for textual content in multiple languages using multilingual NLP models trained to analyze the textual content and to provide content recommendations based on that textual content. The textual content may be content from a document, slide, social media post, chat message, and/or other textual content. The content recommendations may include but are not limited to icons, images, videos, audio content, emoticons, and/or other non-textual content that may be used to supplement the textual content provided by the user. The specific types of textual content that may be supported and the types of recommendations may depend, at least in part, on the type of application in which the textual content is to be used.

The techniques herein provide a text analysis service that implements a lightweight multilingual solution based on one or more English-language NLP models. The text analysis service is configured to tokenize the textual input, to identify a language of the textual input, and to use one or more bilingual dictionaries to translate non-English-language textual content into English language tokens. The English-language tokens are then analyzed using a one or more models to infer contextual information for the textual content. The contextual information may then be used to make content recommendation to a user based on the context information inferred from the textual content.

Converting the non-English language tokens into English-language tokens using a bilingual dictionary may not convey all the context of the textual content being translated. A bilingual dictionary typically maps a word from a source language to a corresponding word or words in a target language. Important contextual information may be lost because individual words are translated without considering the usage of other words in the textual content. This problem may be exacerbated due to the limitations of the size of the bilingual dictionary. A larger dictionary will map more words from the source language to corresponding words of the target language but will also consume more memory and computing resources to support the dictionary. No matter how large the dictionary, not every word in the source language can possibly be included in the dictionary. There will inevitably be words in the textual content to be translate that have not been mapped to the target language. Consequently, the resulting translated text may be disjointed and include gaps in the translated text. The techniques herein overcome this problem by training one or more English-language NLP models with training data that includes English text that mimics the roughly translated text generated using bilingual dictionaries. A technical benefit of this approach is that the accuracy of the inferences generated by these English-language NLPs models are significantly higher than the inferences produced by English-language NLP models that were trained with training data that included proper English grammar. Consequently, the multilingual content recommendation techniques provided herein may provide high quality content recommendations for textual inputs in multiple languages without requiring NLP models in each of the supported languages to be trained. These and other technical benefits of the techniques disclosed herein will be evident from the discussion of the example implementations that follow.

FIG. 1 is a diagram showing an example computing environment 100 in which the techniques disclosed herein for providing content recommendations using multilingual NLP models may be implemented. The computing environment 100 may include a text analysis service 110. The example computing environment 100 may also include a client device 105 and an application service 125. The client device 105 may communicate with the text analysis service 110 and/or the application service 125 via the network 120.

In the example shown in FIG. 1, the text analysis service 110 is implemented as a cloud-based service or set of services. The text analysis service 110 may be configured to receive a request to analyze textual content from the client device 105 and/or the application service 125. The text analysis service 110 may include one or more NLP models that are configured to analyze the textual input and provide an output based on the textual input based on a contextual analysis of the textual input. The NLP models provided by the text analysis service 110 may depend upon the services offered by the application service 125. The text analysis service 110 may support textual content in multiple languages but may implement English-language NLP models and utilize bilingual dictionaries to translate textual content in other languages to English for analysis. Additional details of how the NLP models may be trained and used to analyzed textual content are described in the examples which follow.

In the example implementation shown in FIG. 1, the application service 125 may be a presentation design application, such as but not limited to Microsoft® PowerPoint®. The application service 125 may include a design recommendation service that provides suggestions for improving the design and layout of the presentation slides. The application service 125 may be configured to send textual content of a slide or slides to the text analysis service 110 for analysis, and the text analysis service 110 may analyze the textual content of the slide or slides using the multilingual textual analysis techniques implemented by the text analysis service 110. The text analysis service 110 translates non-English-language content to English before analyzing the content.

The text analysis service 110 may provide models configured to provide one or more type of content recommendation. For example, the content recommendation models may include but are not limited to a text-to-image model, a text-to-video model, a text-to-emoji model, a text-to-icon model, and/or other NLP models that may be configured to suggest content elements based on the textual input. In some implementations, a single NLP model may be trained to provide recommendations of more than one type of content in response to textual inputs.

The content recommendations output by the content recommendation model or models may be provided to the application service 125 for presentation to the user. The application service 125 may provide a user interface for displaying the content recommendations and for allowing the user to select suggested content elements to add to a slide or slides to improve the layout and or design of the slides.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes one client device, other implementations may include multiple client devices that may utilize the application service 125. Furthermore, in some implementations, the application functionality provided by the application service 125 may be implemented by a native application installed on the client device 105, and the client device 105 may communicate directly with the text analysis service 110 over a network connection.

In the example shown in FIG. 1, the text analysis service 110 is shown as a cloud-based service that may be accessed over a network. However, other implementations of the text analysis service 110 may be achieved by the application service 125 or by the client device 105. For example, the application service 125 may implement an application that is configured to receive textual inputs, to analyze the textual input using the multilingual NLP models provided herein, and to provide content recommendations based on the textual inputs. In other implementations, the functionality of the text analysis service 110 and/or the application service 125 described herein may be carried out on the client device 105.

Figure 2:
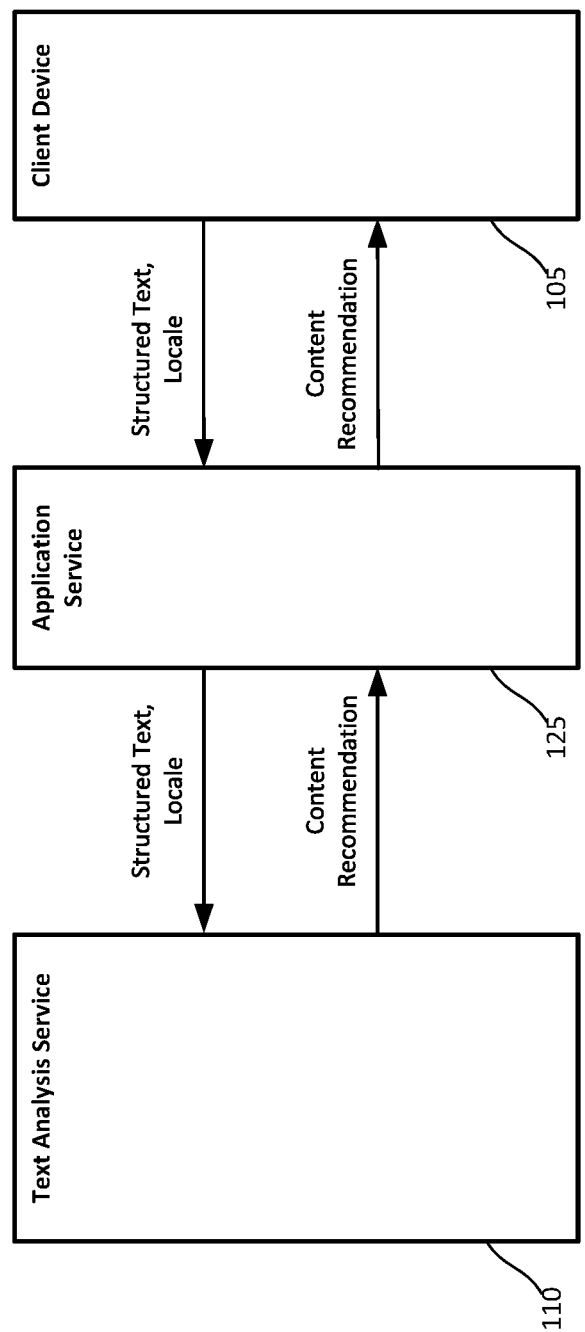
FIG. 2 is an example architecture that may be used, at least in part, to implement the text analysis service shown in FIG. 1.

FIG. 2 is a diagram showing examples of the data that may be exchanged among the text analysis service 110, the application service 125, and the client device 105. A user may access the services provided by the application service 125 via a web browser or native application. The client device 105 may provide structured text and locale information to the application service. The structured text is textual content may be in one or more languages. The structured text may be a textual content included in a document, slide, social media post, chat message, and/or other textual content which the user is working on in an application provided by the application service 125. The client device 105 may provide locale information indicating a geographical location where the client device is located. The local information may be useful for identifying the language and/or dialect used in the textual content. The client device 105 may also provide other information that may be useful for determining the language and/or dialect of the textual content, such as but not limited to language settings for the operating system, language settings for user interface of the application being used, and/or other information that may be indicative of the language and/or dialect included in the textual content. The application service 125 may provide the information obtained from the client device 105 to the text analysis service 110 for processing. The text analysis service 110 may provide a content recommendation, such as but not limited to an icon, an image, video, audio, or emoticon, in response to the structured text and other information provided by the client device 105. The application service 125 may then provide the content recommendations to the client device 105. The client device 105 may present the content recommendations to a user of the client device 105 via a user interface configured to allow the user to select one or more of the content recommendations to be integrated into a document, slide, social media post, chat message, and/or other textual content which the user is working on in the application. In some implementations, the text analysis service 110 may provide the content recommendations directly to the client device 105.

Figure 3:
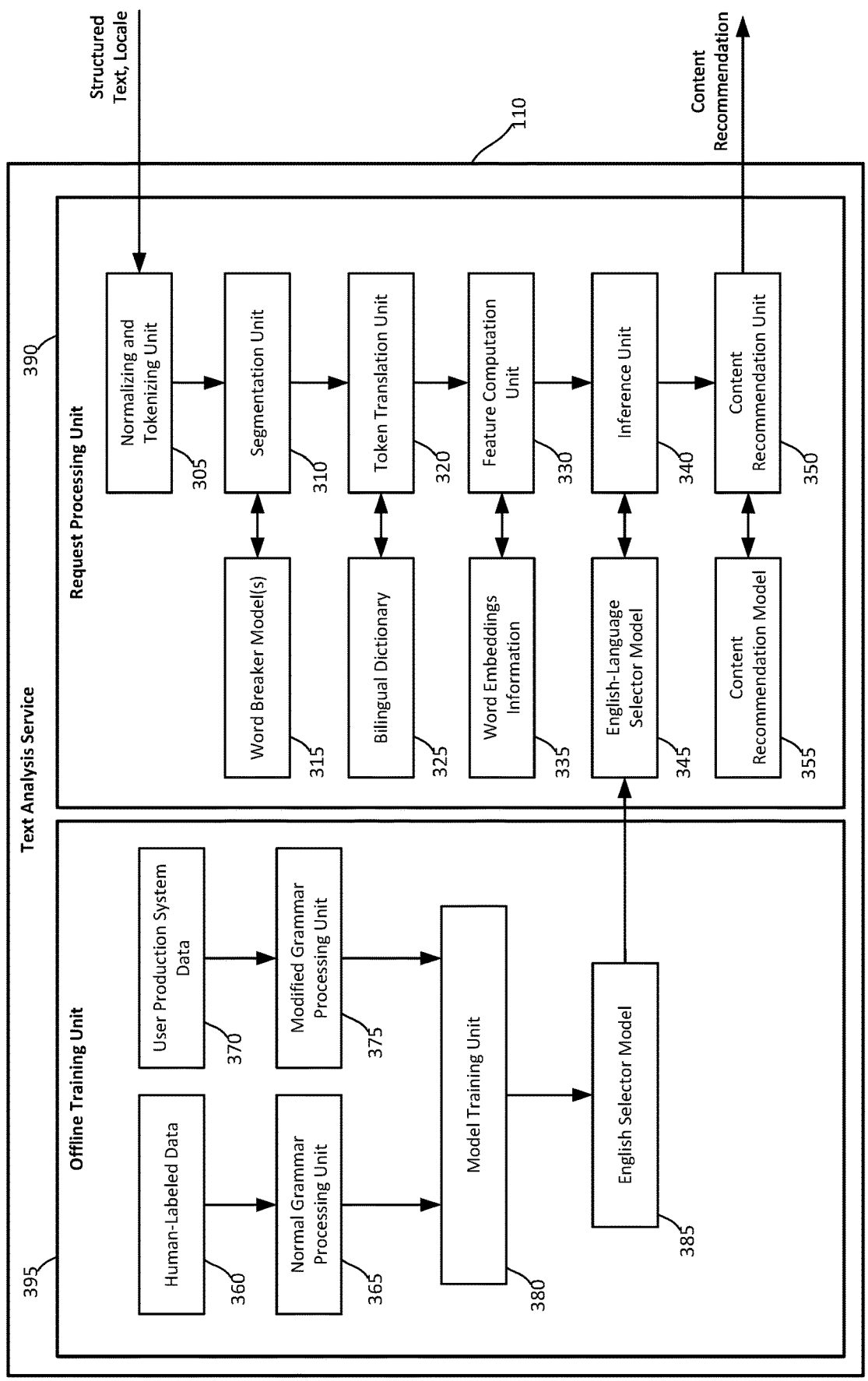
FIG. 3 is a diagram of an example implementation of the text analysis service shown in FIGS. 1 and 2.

FIG. 3 is diagram of any example implementation of the text analysis service 110. The text analysis service 110 may include a request processing unit 390 and an offline training unit 395. The request processing unit 390 may be configured to handle requests for content recommendations from the application service 125 and/or the client device 105 and provide a content recommendation to the application service 125 and/or the client device 105. The offline training unit 395 is configured to train one or more English-language NLP models that may be used by the request processing unit 390 to analyze English-language text extracted from the structured text or obtained by translating non-English text extracted from the structured text.

The request processing unit 390 may include a normalizing and tokening unit 305, a segmentation unit 310, word breaker model(s) 315, a token translation unit 320, bilingual dictionary 325, feature computation unit 330, word embeddings information 335, inference unit 340, an English-language selector model 345, a content recommendation unit 350, and a content recommendation model 355.

The request processing unit 390 is configured to receive the structed text and the locale information from the from the client device 105 and/or the application service 125. The locale information may include information indicative of a language and/or dialect of language that may be included in the structured text. The locale information may include user interface language information that indicates which language the user interface of the application on the client device 105 is set to display text and/or perform other actions. The locale information may include location information designating geographical location of the client device 105. The location information may include a precise geographical location of the user or may include coarse geographical information, such as country or region in which the client device 105 is located. The precision of the location information may be limited by user privacy settings on the client device 105. However, even a coarse geographical location may be sufficient to determine whether the text input may be provided in a regional dialect of a language.

The normalizing and tokening unit 305 may be configured to receive the structured text and the locale information as an input. The normalizing and tokening unit 305 may be configured to provide the structured text and the locale information to a machine learning model or models trained to receive such inputs and to output a prediction of the language of the content of the text input. The machine learning model or models may be trained to predict that the language is a regional dialect of the language based on the locale information. The normalizing and tokening unit 305 may use this prediction to determine whether the language of the structured text is a continuous or non-continuous script language. The words in non-continuous script languages, such as but not limited to English, French, Spanish, and Portuguese, are separated by breaks or spaces between words. In contrast, continuous script languages do not include breaks or spaces between words. Japanese, Chinese, Korean, and Thai are a few examples of languages that do not include breaks or spaces between words.

If the normalizing and tokening unit 305 determines that the structured text is not in a continuous script language, the normalizing and tokening unit 305 may segment the text according to these breaks or spaces to output a set of tokens that represent the words of the textual input. The normalizing and tokening unit 305 may also normalize the tokens. The normalization of the tokens may standardize the tokens to remove superficial differences. The normalizing and tokenizing unit may remove capitalization and punctuation from the tokens. Other types of normalization may also be performed on the tokens instead of or in addition to these examples. The tokens may be normalized to improve the accuracy of the predictions of the models used to analyze the tokenized content. The tokens may be normalized so that the tokenized data to be analyzed by the one or more NLP models is similar to the training data used to train the one or more NLP models used by the request processing unit 390. Furthermore, normalizing the tokens may increase the likelihood of obtaining a match in the bilingual dictionary 325.

If the normalizing and tokening unit 305 determines that the structured text is in a continuous script language, the normalizing and tokening unit 305 may output the structured text to the segmentation unit 310 for further processing. The segmentation unit 310 may be configured to provide the structured text in such continuous script languages to the word breaker model 315 to analyze the structural text and break the text into tokens representing separate words if the normalizing and tokening unit 305 determined that the structured text is in a continuous script language. Otherwise, the segmentation unit 310 may output the tokens output by the word breaker model 315 or received from the normalizing and tokening unit 305.

The token translation unit 320 is configured to receive the list of tokens obtained from the structured text and to translate the tokens using the bilingual dictionary 325. The token translation unit 320 may have access to one or more bilingual dictionaries that are configured to translate tokens in a non-English language to English. The bilingual dictionaries may comprise a table or other structure that maps a word in a non-English language to the corresponding English word. The text analysis service 110 may include a plurality of bilingual dictionaries, and the token translation unit 320 may select the appropriate dictionary based on the language of the structured text determined by the normalizing and tokening unit 305. Analyzing textual content with a bilingual dictionary may be much faster than analyzing the textual content with a machine learning model, but the translations obtained from the bilingual dictionary may be highly inaccurate. The bilingual dictionary performs a word-by-word translation that lacks important contextual information that may be derived by analyzing the usage of a word in the context of the textual content. For example, assume that a first non-English word may be translated to mean: (1) moon, (2) months, or (3) months. The bilingual dictionary has no way of differentiating between these meanings because the bilingual dictionary translates each word separately. In contrast, a machine learning model may analyze the text surrounding the word to predict what the meaning may be. Consequently, the usage of a bilingual dictionary alone may provide a poor translation. However, the text analysis service 110 provides a technical solution to this problem by utilizing one or more machine learning NLP models trained to understand the modified or non-standard grammar produced by using the bilingual dictionary to translate the structured text.

If the language of the structured text is English, no translation is required and the token translation unit 320 may pass the tokens on to the feature computation unit 330. Otherwise, the token translation unit 320 obtains a translation of the non-English tokens to English using the selected bilingual dictionary. If no dictionary is available for the language of the structured text, the text analysis service 110 may halt the analysis of the structured text and no content recommendation will be provided.

The bilingual dictionary 325 may not include a mapping for every word included in the tokenized text. The token translation unit 320 may output a list of English language tokens that correspond to the non-English-language tokens that were received as an input. The token translation unit 320 may include a blank or placeholder token for those tokens for which a translation was not found in the bilingual dictionary. The gaps in the translated text would present a problem for an English-language NLP model that was trained using clean training data that has proper grammar. However, the offline training unit 395 provides a technical solution to this technical problem by training at least one English-language NLP model with training data that includes data that has similar gaps in the data. The NLP model adapts to textual content that includes gaps due to the limitations of the bilingual dictionary 325. Thus, the NLP model may still provide very good predictions of the context of the textual input and the text analysis service 110 may still provide relevant content recommendations to the user.

The token translation unit may provide the English-language tokens as an input to the feature computation unit 330. The feature computation unit 330 may be configured to convert the English-language tokens into a format that may be understood by the NLP models. In some implementations, the feature computation unit 330 may determine numerical vector, referred to as a feature vector, that represents the features extracted from the text of the tokens. Various techniques may be used to extract the feature information from the tokens. In some implementations, the feature computation unit 330 may utilize a bag-of-words approach for determining the feature information. Furthermore, the feature computation unit 330 may be configured to use the word embeddings information 335 when determining the feature vector for the input tokens. The word embeddings information 335 may include vectors of data that represent the relationship between words. Words that have a similar meaning have a similar representation. The feature computation unit 330 may use this information to ensure that similar tokens received as input are given a similar representation in the feature vector computed for the tokens. For example, the tokens for the words "bird" and "duck" are more similar than the words "bird" and "truck". The numerical representation of these words in the feature vector represents this relationship.

The feature vector determined by the feature computation unit 330 may be provided as an input to the inference unit 340. The inference unit 340 may be configured to select provide the feature vector as input to an English-language NLP model, such as the English-language selector model 345. In some implementations, the request processing unit 390 may include a single English-language NLP model or more than one English-language NLP model. In implementations with a single English-language NLP model, the single English-language NLP model is used to analyze feature vectors determined from the structured text for all supported languages.

In other implementations, the request processing unit may utilize more than one English-language NLP model. The models may include a first English-language NLP model trained for processing English language structured text and one or more English-language NLP model trained for processing non-English language structured text. The first English-language NLP model may be trained with English-language training data based on human-labeled data and that includes normal English-language grammar. The one or more second English-language NLP models may be trained to infer contextual information from structured text that has been translated from a language other than English. As discussed in the preceding examples, the use of the bilingual dictionaries to translate the tokens of the non-English languages may result in modified or non-standard grammar. The translation may also include gaps in the tokens where the bilingual dictionary did not include a mapping from a non-English word to an equivalent English word. The one or more second English-language NLP models are trained using training data that mimics this modified or non-standard grammar. The training of the one or more second English-language NLP models is discussed with respect to the offline training unit 395.

The inference unit 340 may obtain contextual information output by the English-language NLP model selected by the interference unit 340. The contextual information includes information associated with the contents of the structured text. The contextual information may identify one or more topics or subject matter of the structured text. The contextual information may be provided as an input to the content recommendation model 355 to obtain content recommendations. A content recommendation may be an icon, an image, video, audio, an emoticon, or other type of content. In some implementations, a single content recommendation model 355 may be configured to provide recommendation that may include more than one type of content recommendation, while in other implementations multiple content recommendation models 355 may be configured to provide recommendations for only a single type of content. The content recommendation or recommendations may then be provided to the application service 125 and/or the client device 105. The content recommendation or recommendations may be presented to the user in an application on the client device 105. The user may opt to include the one or more content recommendations in the electronic content that the user is creating or modifying in the application.

The offline training unit 395 may be configured to train the English-language NLP model or models based on human-labeled data 360 and user production system data 370. The human-labeled data 360 is English-language textual content that has been reviewed by a human and been associated with a tag or label. The tag or label associated with the data provides a classification associated with the textual content. This classification may be used to identify relevant content recommendations for the textual content. The tag or label associated with the data helps train the machine learning models to infer that similar textual content is also associated with that classification. The human-labeled data may include correct English grammar and/or commonly used English grammar. The human-labeled data may be used to train the one or more English-language NLP models to provide highly accurate predictions regarding the types of content or subject matter included in the structured text. High quality human-labeled data, such as the human-labeled data 360, is typically more readily available and often of higher quality than human-labeled training data that may be available for other languages. However, the text analysis service 110 overcomes this issue by using a combination of bilingual dictionaries and specially trained English-language NLP models as discussed in the examples which follow.

The user production system data 370 is textual content that is obtained from user inputs to the system and/or mimic user inputs. The user product system data 370 mimics the modified and/or non-standard grammar that may result from using the bilingual dictionary 325 to translate the structured text from a non-English language to English. As discussed in the preceding examples, the bilingual dictionary 325 may perform a word-by-word translation of the non-English text that may result in gaps in the translated content and poorly formed grammar. Processing the translated information with a standard English-language NLP trained using English-language data having typical English language grammar will typically result in poor inferences of the contextual information of the structural text. However, if the English-language model is trained using labeled training data derived from the user production system data 370 and training data having standard English grammar, such as the human-labeled data 360.

The normal grammar processing unit 365 may be configured to analyze the human-labeled data 360 and to perform feature extraction on the human-labeled data 360. The normal grammar processing unit 365 may generate feature vectors from the human-labeled data 360 and associate the human-provided labels with the feature vectors to generate training data for an English-language NLP model or models. The modified grammar processing unit 375 may be configured to perform feature extraction on the user production system data 370 to generate feature vectors from the user production system data 370. The user production system data 370 may also be labeled by human users. The training data provided by the normal grammar processing unit 365 and the modified grammar processing unit 375 may be provided to the model training unit 380.

The offline training unit 395 may train a single English-language NLP model, such as the English selector model 385, to handle feature vectors extracted from both English language and non-English language structured text. In some implementations, the offline training unit 395 may train an English-language model dedicated to analyzing English-language structured text and one or more English-language models dedicated to analyzing translated text. The offline training unit 395 may train the one or more models dedicated to analyzing the translated text using training data derived from both the human-labeled data 360 and the user production system data 370. The human-labeled data 360 provides the model with training using baseline data with proper grammar, while the training data derived from the user production system data 370 provides the model with training for dealing with modified and/or non-standard grammar that may result from using the bilingual dictionary 325 to translate the structured text from a non-English language to English. In some implementations, the offline training unit 395 may train language specific models for handling the English-language text resulting from the translation of that language. This approach may provide better results for certain languages, because the patterns found in the translated English text for those languages may differ from other languages and the models may be trained recognize these patterns.

The English-language NLP model or models generating using the model training unit 380 may then be deployed to a production environment in which the request processing unit 390 may utilize the models to analyze structured text input received from the user device 105 and/or the application service 105.

Figure 4:
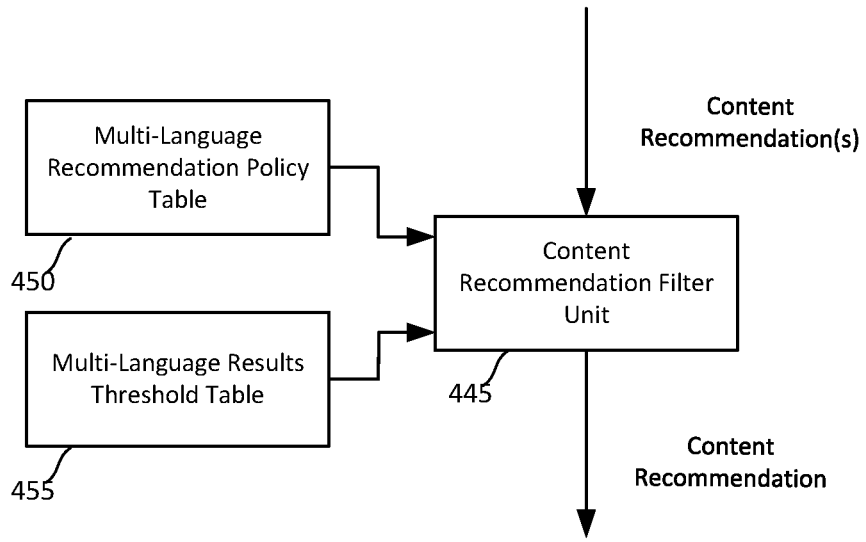
FIG. 4 is a diagram of an example content recommendation filtering unit 445 that may be implemented by the text analysis service 110.

FIG. 4 is a diagram of an example content recommendation filtering unit 445 that may be implemented by the text analysis service 110. The content recommendation filter unit 445 may be configured to analyze the content recommendations provided by the content recommendation unit 350. The content recommendation filter unit 445 may be configured to access the multi-language recommendation policy table 450 and the multi-language results threshold table 455 to obtain information that may be used to determine whether the content recommendations output by the content recommendation unit 350 may be provided to the application service 125 or the client device 105. The multi-language recommendation policy table 450 may include information that indicates that certain images, videos, icons, emojis, or other types of content should be blocked for each language supported by the text analysis service 110. Each type of content may be associated with specific content and/or types of content that may not be provided as a recommendation, because the specified content and/or type of content may be deemed offensive. For example, images depicting nudity, violence, drug usage, and/or other specified types of content may be identified as being blocked. The multi-language recommendation policy table 450 may identify specific content as well as types of content recommendations that should not be output by the text analysis service 110. For example, the multi-language recommendation policy table 450 may include a filename, link, network address, or other references to a specify content items that should not be provided as a content recommendation.

The content recommendation filter unit 445 may utilize the policies provided in the multi-language recommendation policy table 450 to assess whether each of the recommendations provided as output by the content recommendation unit 350 should be permitted to be presented to a user or suppressed. The content recommendation filter unit 445 may use metadata associated with the content recommendation and/or analyze the content recommendations using various matching algorithms and/or models to determine whether a content recommendation is a specific content item or type of content item that should be suppressed. If the content recommendation should be suppressed, then no content recommendation is presented to the user.

The content recommendation filter unit 445 may access the multi-language results threshold table 455 to obtain information that may be used to determine whether the content recommendations output by the content recommendation unit 350 are sufficiently accurate to present to users. The content recommendation unit 350 may utilize multiple content recommendation models for which the models may provide varying levels of prediction quality. Training data may be difficult and/or expensive to obtain for certain languages. Thus, the recommendation models may not provide content recommendations for certain languages. The content recommendation filter unit 445 may be configured to determine whether a prediction certainty value associated with the first content recommendation exceeds a particular threshold value associated with the language of the text input. The content recommendation unit 350 may be configured to generate the prediction certainty value with the content recommendations in some implementations. In other implementations, the prediction certainty value may be determined through testing and set for all recommendations made by a particular content recommendation model and language. The prediction certainty values determined through testing may improve over time as the content predictions provided by the models are refined.

The content recommendation filter unit 445 may suppress the content recommendations provided by the content recommendation unit 350 if the content recommendation includes content that should be suppressed, the prediction certainty value does not satisfy the language-specific threshold, or both. Otherwise, the content recommendation filter unit 445 may output the content recommendations to the application service 125 or the client device 105.

Figure 5:
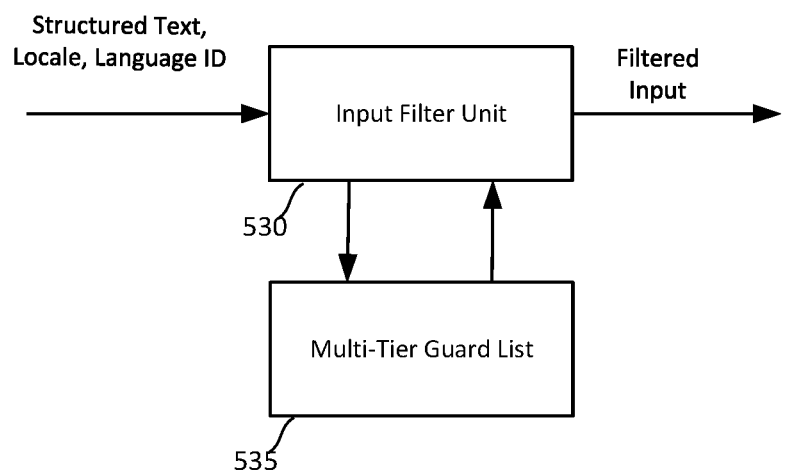
FIG. 5 is a diagram of an example input filter unit that may be implemented by the text analysis service.

FIG. 5 is a diagram of an example input filter unit 530 that may be implemented by the text analysis service 110. The input filter unit 530 may be configured to access the multi-tier guard list 535 and analyze the tokenized text received from the segmentation unit 310. The multi-tier guard list 535 may include a list of prohibited words for each of the languages supported by the text analysis service 110. The multi-tier guard list 535 may include a set of high severity words and a set of low severity prohibited words for each of the supported languages. The high severity words for a particular supported language are words that are considered offensive in any context for that language. The low severity words are words that may considered to be offensive in some contexts and/or in some dialects of a language. For example, certain words or phrases may be offensive in certain dialects of a language but not in other dialects of that language. Furthermore, certain words or phrases may be offensive in certain geographical areas in which a particular language is spoken but not in other geographical areas. The low severity words may also be associated with a category of word, such as but not limited to "drugs" or "guns." Certain categories of words may be considered offensive in some geographical areas but not in other areas. The guard list may indicate the geographical areas where no content suggestions should be provided for words that may be considered offensive in those areas. The guard list for each language may be updated periodically by a team of linguists skilled in that language. The team of linguists may include members who are familiar with differences in regional dialects and who are familiar with changing views of the usage of certain words or phrases based on changing usage, current events, politics of the regions in which the language is used, and other factors which may change how the usage of certain words are used.

The input filter unit 530 may be configured to determine whether the tokenized text includes at least one of the high-severity prohibited words and to end processing of the text input responsive to detecting at least one of the high-severity prohibited words in the text input. If the input filter unit 530 determines that the tokenized text includes no high severity prohibited words for the language of the input text but detects a low severity prohibited word, the input filter unit 530 may use the location information associated obtained from the client device 105 to determine whether the low severity prohibited word is prohibited in the geographical area in which the client device 105 is located. If a low severity prohibited word is prohibited in the geographical area of the client device 105, the input filter unit 530 may end processing of the text input. No content recommendation is provided where a word or phrase included in the text input may be found offensive to avoid offending users and to the NLP models creating used by the text analysis service 110 of an associated between these prohibited words and any content recommendation. Otherwise, if no high severity word or geographical problematic low severity words were included in the text input, the input filter unit 530 may provide the tokenized text to the token translation unit 320 for translation to English.

Figure 6:
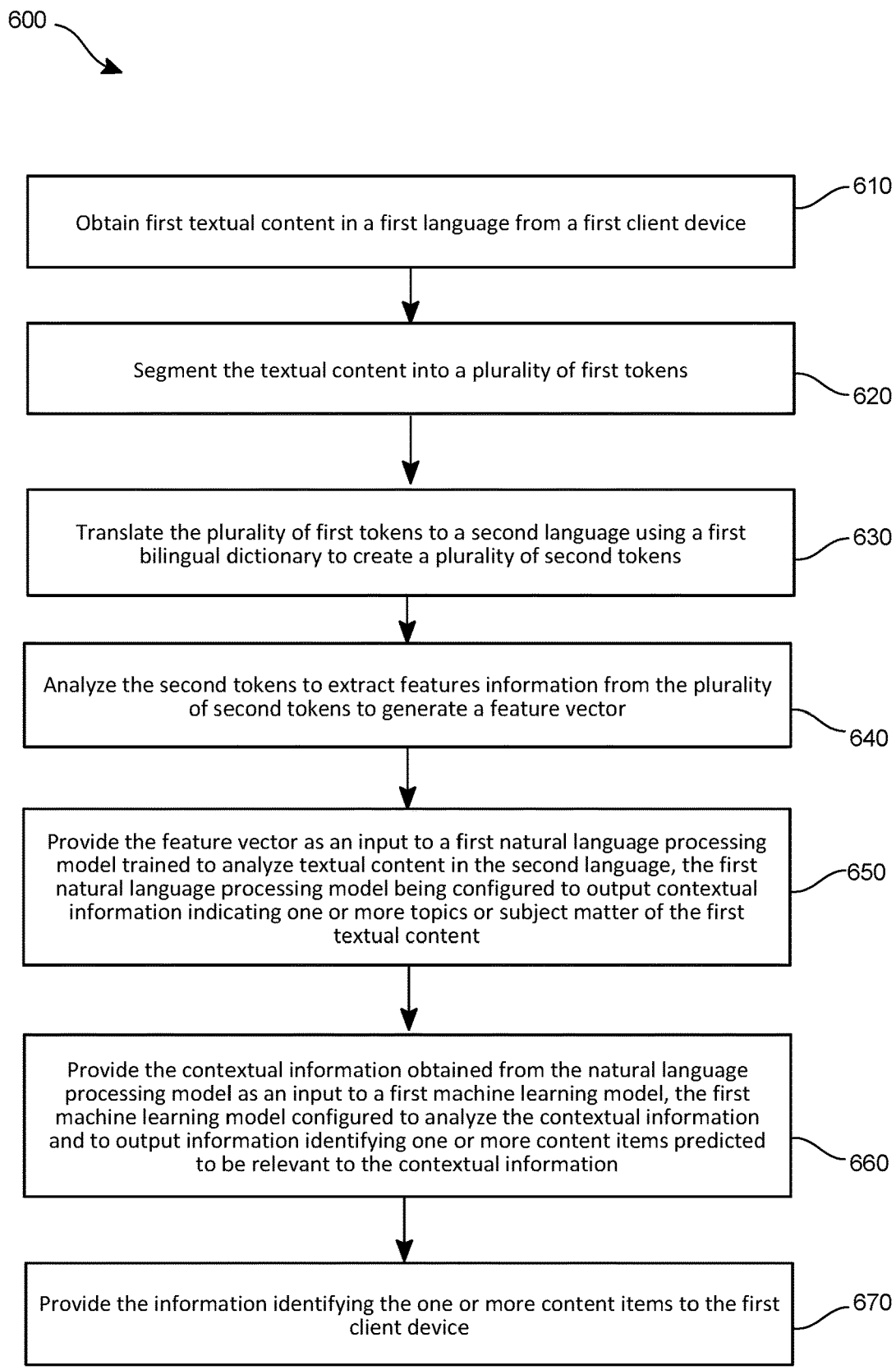
FIG. 6 is a flow diagram of another process for providing content recommendations that may be implemented by the text analysis service.

FIG. 6 is an example flow chart of an example process 600 that may be implemented by the text analysis service 110.

The process 600 may include an operation 610 of obtaining textual content in a first language from a first client device 105. The client device 105 may provide structured text from an application. The structured text may be from a document, slide, social media post, chat message, and/or other textual content. The structured text may be content that is being modified or created by the user.

The process 600 may include an operation 620 of segmenting the textual content into a plurality of first tokens. The normalizing and tokenizing unit 305 may tokenize the content when the textual content is in a non-continuous script language, and the segmentation unit 310 may segment the textual content into tokens when the textual content is in a continuous script language. The tokens represent separate words in the textual content.

The process 600 may include an operation 630 of translating the plurality of first tokens to a second language using a first bilingual dictionary to create a plurality of second tokens. The token translation unit 320 may select a bilingual dictionary for translating the tokens in the first language to the second language. In the previous examples, the first language is a non-English language, and the second language is English. However, the techniques provided herein are not limited to English and non-English languages. The first language may be any language for which it may be difficult and/or expensive to obtain sufficient training data for training a machine learning model to analyze content in the first language. The second language may be any language for which it is easier and/or less expensive to obtain sufficient training data in the second language for training a machine leaning model to analyze content in the second language.

The process 600 may include an operation 640 of analyzing the second tokens to extract features information from the plurality of second tokens to generate a feature vector The process 600 may include an operation 650 of providing the feature vector as an input to a first natural language processing model trained to analyze textual content in the second language. The natural language processing model is configured to output contextual information indicating one or more topics or subject matter of the first textual content. The inference unit 340 may select an appropriate NLP model configured to analyze textual content in the second language.

The process 600 may include an operation 660 of providing the contextual information obtained from the first natural language processing model as an input to a first machine learning model. The first machine learning model may be configured to analyze the contextual information and to output information identifying one or more content items predicted to be relevant to the contextual information. The content recommendation unit 350 of the text analysis service 110 may provide the contextual information output by the inference unit 340 to the content recommendation model 355. The content recommendation model may suggest one or more content recommendations, such as but not limited to an icon, an image, video, audio, or emoticon that may be relevant to the user based on the topics and or subject matter included in the structured text.

The process 600 may include an operation 670 of providing the information identifying the one or more content items to the first client device. The information identifying the one or more content items may be sent the client device 105 of the user so that the client device may present the one or more content items to the user. The client device 105 may obtain copies of the content items and permit the user to add the content items to content being created by the user and added to the content being modified or created by the user.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
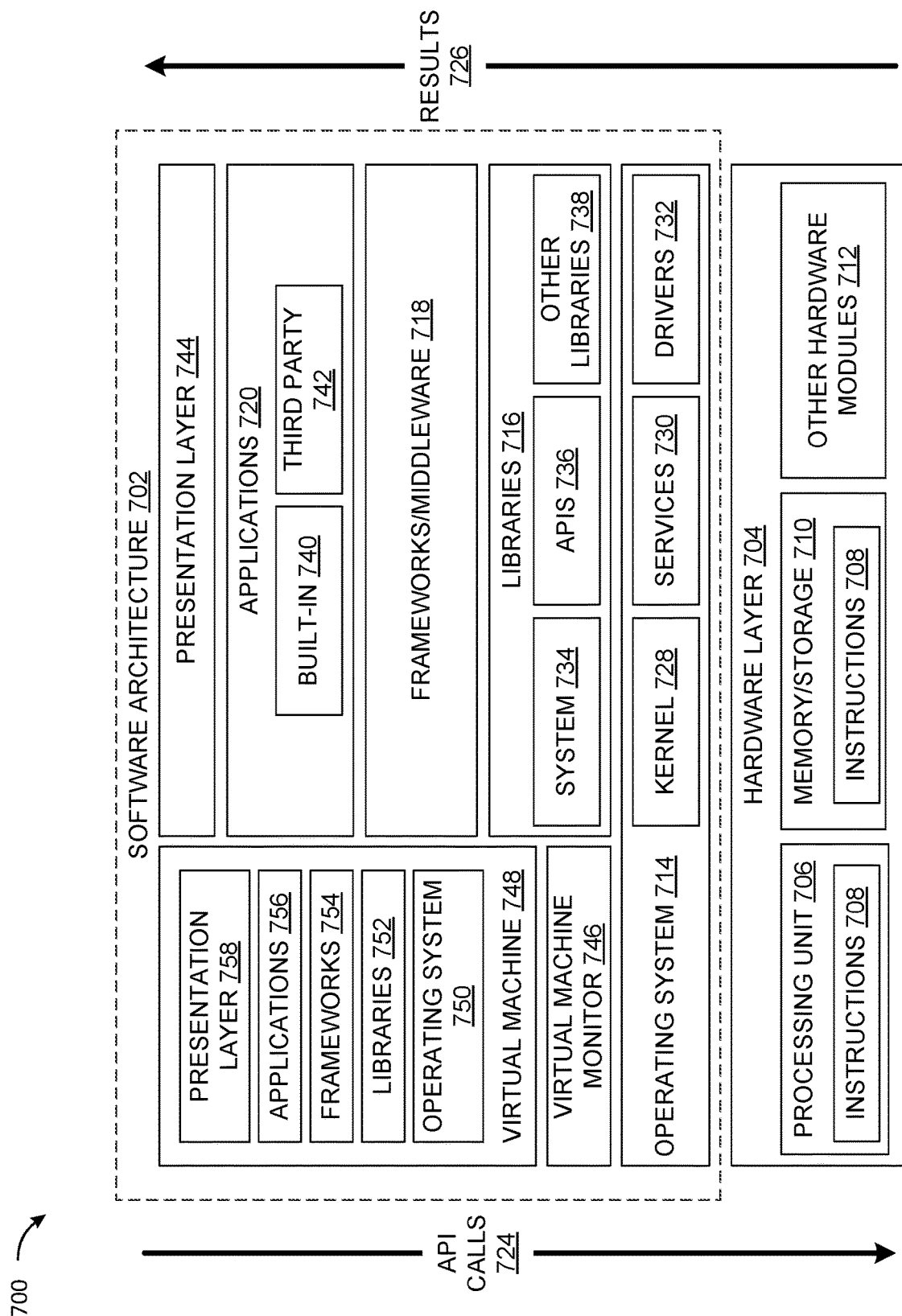
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. Z is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 624 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 638 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
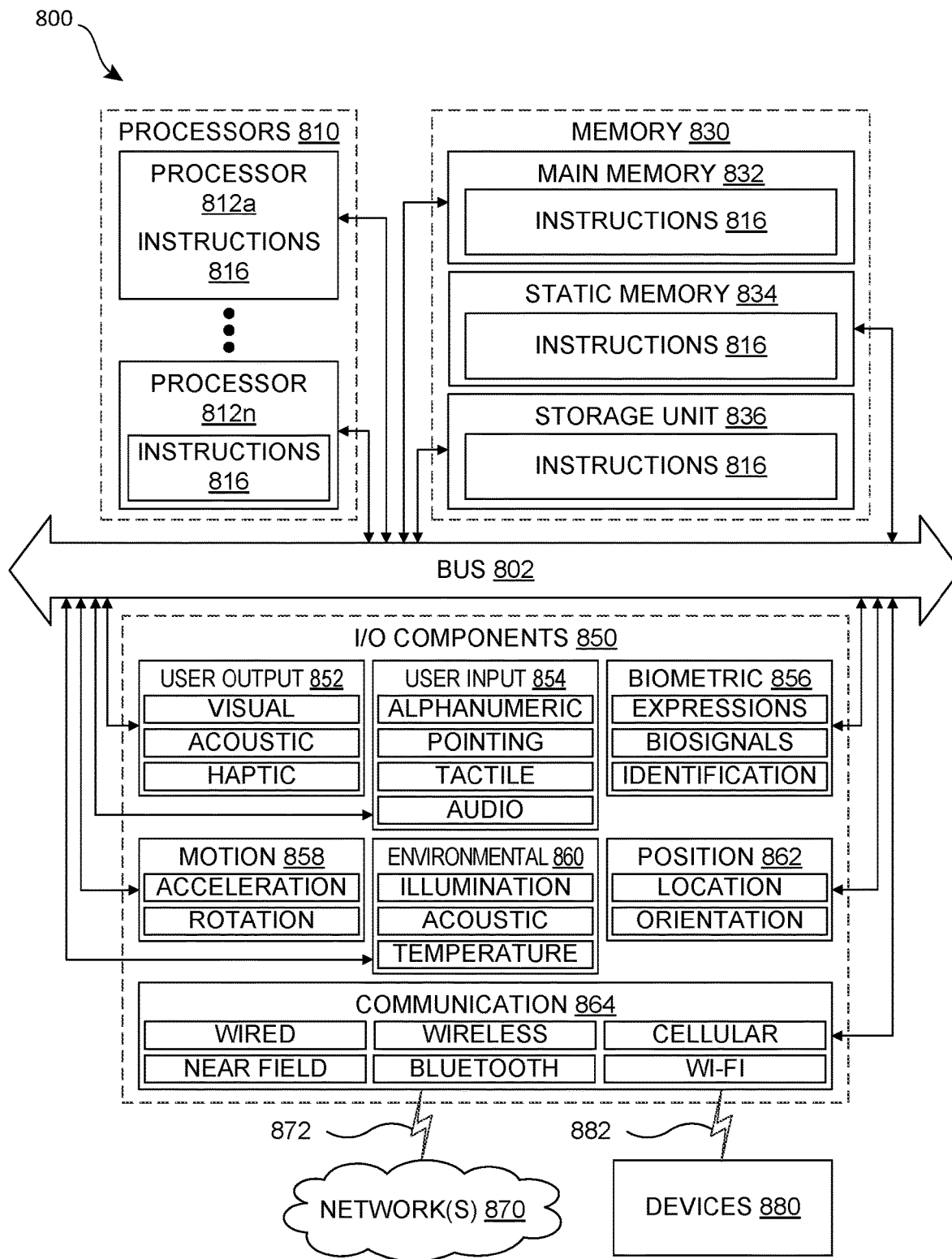
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations comprising:
training a first natural language processing model to analyze textual content in a target language and to output contextual information indicating one or more topics or subject matters of the textual content using training data that includes examples of non-standard grammar resulting from translating a plurality of source languages to the target language using a plurality of bilingual dictionaries;
obtaining the textual content from a first client device;
determining, based on analyzing the textual content, that is in a first language selected from among the plurality of source languages;
segmenting the textual content into a plurality of first tokens responsive to identifying the first language;
selecting a first bilingual dictionary from among the plurality of bilingual dictionaries based on the first language identified in the textual content, each bilingual dictionary of the plurality of bilingual dictionaries maps tokens in one of the plurality of source languages to tokens in the target language;
translating the plurality of first tokens to the target language using the first bilingual dictionary to create a plurality of second tokens;
analyzing the plurality of second tokens to extract features information from the plurality of second tokens to generate a feature vector;
providing the feature vector as an input to the first natural language processing model trained to analyze textual content in the target language to cause the first natural language processing model to analyze the feature vector and output the contextual information indicating one or more topics or subject matter of the textual content;
providing the contextual information obtained from the first natural language processing model as an input to a first machine learning model, the first machine learning model configured to analyze the contextual information and to output content information identifying one or more content items predicted to be relevant to the contextual information; and
providing the content information identifying the one or more content items to the first client device.

2. The data processing system of claim 1, wherein the machine-readable storage medium includes instructions configured to cause the processor to perform operations of:
selecting the first natural language processing model from a plurality of natural language models based on the first language.

3. The data processing system of claim 1, wherein the machine-readable storage medium includes instructions configured to cause the processor to perform operations of:
training the first machine learning model with second data comprising human-labeled data that includes a correct grammar for the target language.

4. The data processing system of claim 1, wherein the machine-readable storage medium includes instructions configured to cause the processor to perform operations of:
analyzing the textual content with a first input filter to determine whether the textual content includes potentially offensive content; and
not providing the content information identifying the one or more content items to the first client device when the textual content includes the potentially offensive content.

5. The data processing system of claim 1, wherein the machine-readable storage medium includes instructions configured to cause the processor to perform operations of:
analyzing the content information identifying the one or more content items using a content recommendation filter configured to determine whether the content information includes a content recommendation that is potentially offensive; and
discarding the content recommendation when the content information includes a recommendation that is potentially offensive.

6. A method implemented in a data processing system for providing content recommendations based on a multilingual natural language processing model, the method comprising:
training a first natural language processing model to analyze textual content in a target language and to output contextual information indicating one or more topics or subject matters of the textual content using training data that includes examples of non-standard grammar resulting from translating a plurality of source languages to the target language using a plurality of bilingual dictionaries;
obtaining the textual content from a first client device;
determining, based on analyzing the textual content, that is in a first language selected from among the plurality of source languages;
segmenting the textual content into a plurality of first tokens responsive to identifying the first language;
selecting a first bilingual dictionary from among the plurality of bilingual dictionaries based on the first language identified in the textual content, each bilingual dictionary of the plurality of bilingual dictionaries maps tokens in one of the plurality of source languages to tokens in the target language;
translating the plurality of first tokens to the target language using the first bilingual dictionary to create a plurality of second tokens;
analyzing the plurality of second tokens to extract features information from the plurality of second tokens to generate a feature vector;
providing the feature vector as an input to the first natural language processing model trained to analyze textual content in the target language to cause the first natural language processing model to analyze the feature vector and output the contextual information indicating one or more topics or subject matter of the textual content;
providing the contextual information obtained from the first natural language processing model as an input to a first machine learning model, the first machine learning model configured to analyze the contextual information and to output content information identifying one or more content items predicted to be relevant to the contextual information; and
providing the content information identifying the one or more content items to the first client device.

7. The method of claim 6, further comprising:
selecting the first natural language processing model from a plurality of natural language models based on the first language.

8. The method of claim 6, further comprising:
training the first machine learning model with second data comprising human-labeled data that includes a correct grammar for the target language.

9. The method of claim 6, further comprising:
analyzing the textual content with a first input filter to determine whether the textual content includes a potentially offensive content; and
not providing the content information identifying the one or more content items to the first client device when the textual content includes the potentially offensive content.

10. The method of claim 6, further comprising:
analyzing the content information identifying the one or more content items using a content recommendation filter configured to determine whether the content information includes a content recommendation that is potentially offensive; and
discarding the content recommendation when the content information includes a recommendation that is potentially offensive.

11. A machine-readable medium on which are stored instructions that, when executed, cause a processor of a programmable device to perform operations of:
training a first natural language processing model to analyze textual content in a target language and to output contextual information indicating one or more topics or subject matters of the textual content using training data that includes examples of non-standard grammar resulting from translating a plurality of source languages to the target language using a plurality of bilingual dictionaries;
obtaining the textual content from a first client device;
determining, based on analyzing the textual content, that is in a first language selected from among the plurality of source languages;
segmenting the textual content into a plurality of first tokens responsive to identifying the first language;
selecting a first bilingual dictionary from among the plurality of bilingual dictionaries based on the first language identified in the textual content, each bilingual dictionary of the plurality of bilingual dictionaries maps tokens in one of the plurality of source languages to tokens in the target language;
translating the plurality of first tokens to the target language using the first bilingual dictionary to create a plurality of second tokens;
analyzing the plurality of second tokens to extract features information from the plurality of second tokens to generate a feature vector;
providing the feature vector as an input to the first natural language processing model trained to analyze textual content in the target language to cause the first natural language processing model to analyze the feature vector and output the contextual information indicating one or more topics or subject matter of the textual content;
providing the contextual information obtained from the first natural language processing model as an input to a first machine learning model, the first machine learning model configured to analyze the contextual information and to output content information identifying one or more content items predicted to be relevant to the contextual information; and
providing the content information identifying the one or more content items to the first client device.

12. The machine-readable medium of claim 11, wherein the machine-readable medium includes instructions configured to cause the processor to perform operations of:
selecting the first natural language processing model from a plurality of natural language models based on the first language.

13. The machine-readable medium of claim 11, further comprising instructions configured to cause the processor to perform operations of:
training the first machine learning model with second data comprising human-labeled data that includes a correct grammar for the target language.

14. The machine-readable medium of claim 11, further comprising instructions configured to cause the processor to perform operations of:
analyzing the textual content with a first input filter to determine whether the textual content includes potentially offensive content; and
not providing the content information identifying the one or more content items to the first client device when the textual content includes the potentially offensive content.

* * * * *